Jan. 3, 1928.
W. GENEST
1,654,969
STOCK RECORDING APPARATUS
Filed June 23, 1924
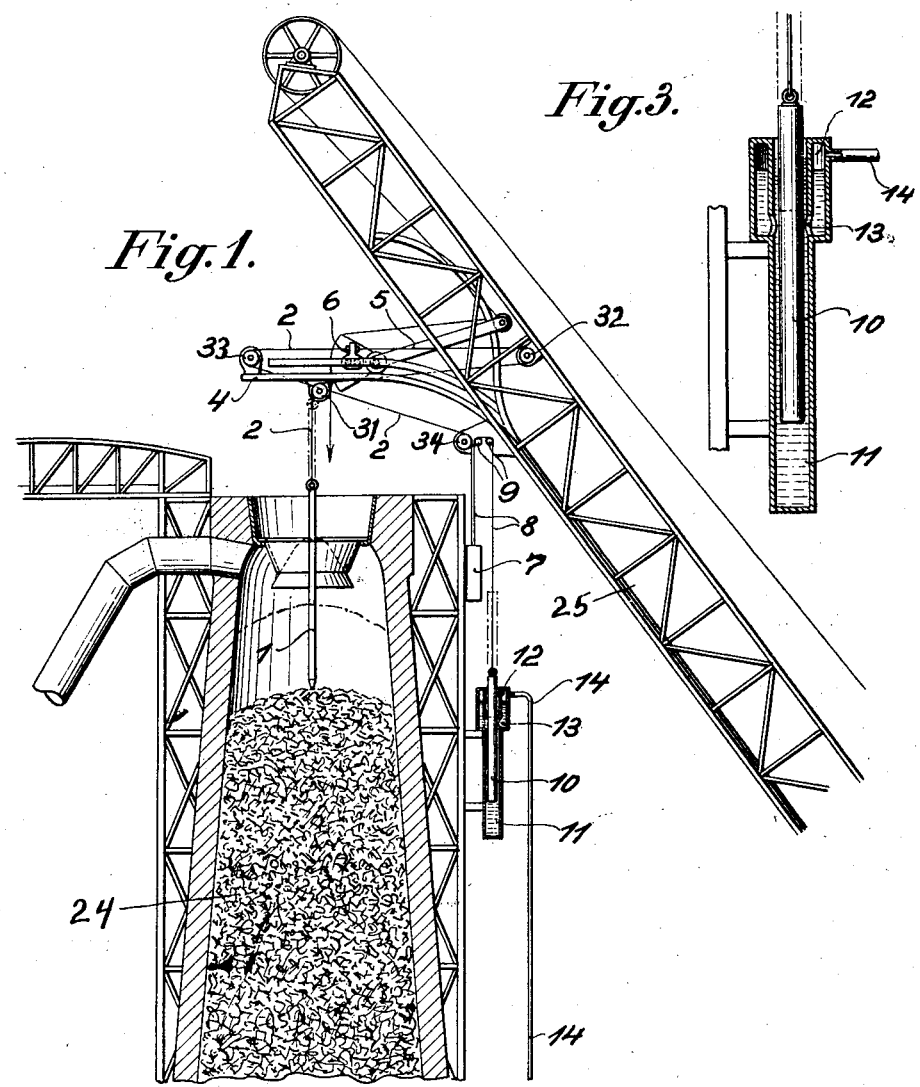
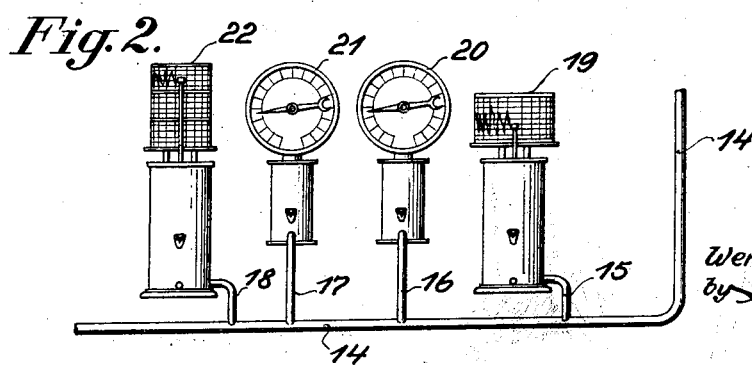
Inventor
Werner Genest
by
Attorney Patented Jan. 3, 1928.

1,654,969

UNITED STATES PATENT OFFICE.

WERNER GENEST, OF BERLIN-LICHTERFELDE, GERMANY.

STOCK-RECORDING APPARATUS.

Application filed June 23, 1924, Serial No. 721,816, and in Germany June 29, 1923.

My invention relates to improvements in a stock recording apparatus for measuring and recording the charge of high furnaces, cupola furnaces, and lime furnaces, and more particularly in apparatus for continuously and automatically measuring the movement of the charge and more particularly the number of the charges filled into the furnace and the level of the charge within the furnace, which measurements are important for examining the operation of the furnace. The object of the improvements is to provide an apparatus which is simple in construction, which is not affected by rough handling, and which is reliable in operation. With this object in view my invention consists in providing automatic means for continuously determining the number of the charges filled into the furnace and the level of the charge within the furnace, providing recording means located at a suitable part of the plant, and providing pneumatic means for transmitting the results of the measuring operations to the measuring and recording means.

For the purpose of explaining the invention an example embodying the same has been shown in the accompanying drawing in which the same reference characters have been used in all the views to indicate corresponding parts. In said drawing Fig. 1, is an elevation partly in section showing the top part of a furnace, apparatus for charging the same, and apparatus for counting and measuring the charge, Fig. 2, is an elevation showing pneumatic measuring, counting and recording apparatus connected with the counting and measuring device of the furnace, and Fig. 3, is a detail view showing the pneumatic transmission apparatus.

In Fig. 1 I have shown the top part of a furnace 24, a structure 25 for lifting cars 5 to the top of the furnace, and guide ways 4 for the said cars, which parts are known in the art and therefore need no detailed description. At a suitable part of the structure 25 rollers 31, 32, 33 and 34 are mounted on which a rope 2 is trained which rope passes successively from roller 31 to the rollers 32, 33 and 34. From the end of the rope depending from roller 31 a feeler 1 in the form of a rod is suspended, which feeler is adapted to be raised and lowered into the furnace and on the top of the charge of the furnace. From the other end of the rope 2 a weight 7 is suspended to which a rope 8, trained on rollers 9, is attached. From the rope 8 a plunger 10 is suspended which is movable within a cylinder 11, a certain clearance being provided between the plunger and the wall of the cylinder to permit the liquid contained within the cylinder 11 to pass upwardly or downwardly when the plunger is lowered or raised. The top part of the cylinder 11 is surrounded by an annular chamber 12 which communicates near its bottom with the cylinder 11 through holes 13 made in the wall of the cylinder. The upper part of the rope 2 is parallel to the guide rail of the car and it is attached to a member 6 movable on the said guide way and in position for being struck by the car moving into position for discharging a new charge into the furnace. The top part of the annular chamber 12 is connected by a pipe 14 having branches 15, 16, 17 and 18 with fluid operated measuring and recording instruments 19, 20, 21 and 22 disposed at a suitable part of the system.

The operation of the system is as follows: When charging the furnace the car 5 shifts the member 6 to the left so that the rope 2 withdraws the feeler 1 from the furnace, and the feeler is not injured by the charge. Furthermore the weight 7 is lowered so as to retract the plunger 10 from the cylinder and the level of the liquid within the chamber 12 falls to a point below the openings 13 and the outer air has access to the said chamber, the pipe 14 and the instruments 19, 20, 21 and 22. Upon the return movement of the car the feeler 1 is moved downwardly until it bears on the surface of the material within the furnace, the weight of the feeler exceeding that of the weight 7. The plunger 10 moves downwardly and into the cylinder 11 thus forcing the water into the chamber 12 which is thereby closed as against the outer air. Now the feeler follows the downward movement of the material within the furnace, and the air confined within the chamber 12 and the pipe 14 is compressed accordingly, the change of the air pressure being transmitted to the registering and measuring instruments, which thus indicate the number of the charges, the intervals of time within which the charges are brought into the furnace, the level of the material within the furnace, and the progress of the movement of the material within the furnace.

While in describing the invention reference has been made to a particular example embodying the same I wish it to be understood that my invention is not limited to the construction shown in the drawing, and that various changes may be made in the general arrangement of the apparatus and the construction of its parts without departing from the invention. For example I do not limit myself to the construction of the apparatus 10, 11, 12, 13 for varying the pressure of the fluid operating the instruments 19, 20, 21, and 22.

I claim:

1. In a stock recording apparatus, an indicator, a tube having a fluid pressure column communicating with said indicator and including a displacement chamber and a liquid movable therein to influence said column, a piston in said chamber and controlling said liquid, a support, an actuating member movable thereon, guide pulleys on said support, a cable trained over said pulleys and connected at a point between its ends to the actuating member, a movable weight, the opposite ends of said cable being respectively connected to the test rod and weight, and a movable looped cable connected at its opposite ends to the piston and the weight.

2. In a stock recording apparatus, an indicator, a tube having a fluid pressure column communicating with said indicator and including a displacement chamber and a liquid movable therein to influence said column, a piston in said chamber and controlling said liquid, a test rod, an actuating member coupled to said rod, and an operative connection between the rod and piston.

3. In a stock recording apparatus, an indicator, a tube having a fluid pressure column communicating with said indicator and including a displacement chamber and a liquid movable therein to influence said column, a piston in said chamber and controlling said liquid, a test rod, a car controlled actuating member coupled to the rod, a weight, and controlling connections between the rod and the weight and between the weight and the piston for governing the movements of the piston in the movements of the rod.

WERNER GENEST.